US006573207B2

(12) United States Patent
Landa et al.

(10) Patent No.: US 6,573,207 B2
(45) Date of Patent: *Jun. 3, 2003

(54) GREY GLASS COMPOSITION INCLUDING ERBIUM

(75) Inventors: Ksenia A. Landa, Grosse Ile, MI (US); Leonid Landa, Grosse Ile, MI (US); Scott V. Thomsen, Milford, MI (US); Anthony V. Longobardo, Howell, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/824,561

(22) Filed: Apr. 3, 2001

(65) Prior Publication Data

US 2002/0160901 A1 Oct. 31, 2002

Related U.S. Application Data

(63) Continuation-in-part of application No. 09/766,673, filed on Jan. 23, 2001, now Pat. No. 6,521,558.

(51) Int. Cl.[7] .............................................. C03C 3/095
(52) U.S. Cl. ........................................... 501/64; 501/71
(58) Field of Search ................................ 501/64, 70, 71

(56) References Cited

U.S. PATENT DOCUMENTS

| | | | |
|---|---|---|---|
| 2,309,070 A | | 1/1943 | Austin et al. |
| 2,382,282 A | | 8/1945 | Austin et al. |
| 2,414,413 A | | 1/1947 | Pavlish et al. |
| 2,524,719 A | | 10/1950 | Tillyer |
| 3,024,121 A | | 3/1962 | Hagedorn |
| 3,121,628 A | | 2/1964 | Loehrke |
| 3,628,932 A | | 12/1971 | Inoue |
| 3,663,474 A | | 5/1972 | Lee Jr., et al. |
| 3,941,605 A | | 3/1976 | Yamashita |
| 4,101,705 A | | 7/1978 | Fischer et al. |
| 4,757,034 A | * | 7/1988 | Prassas .................. 501/13 |
| 5,190,896 A | | 3/1993 | Pucilowski et al. |
| 5,214,008 A | | 5/1993 | Beckwith et al. |
| 5,264,400 A | * | 11/1993 | Nakaguchi et al. ......... 428/220 |
| 5,278,108 A | | 1/1994 | Cheng et al. |
| 5,318,931 A | * | 6/1994 | Nakaguchi et al. ........... 501/27 |
| 5,364,820 A | | 11/1994 | Morimoto et al. |
| 5,446,007 A | | 8/1995 | Krashkevich et al. |
| 5,545,596 A | | 8/1996 | Alvarez Casariego et al. |
| 5,569,630 A | | 10/1996 | Landa et al. |
| 5,952,255 A | | 9/1999 | Seto et al. |
| 5,958,811 A | | 9/1999 | Sakaguchi et al. |
| 5,998,316 A | | 12/1999 | Seto et al. |
| 6,114,264 A | * | 9/2000 | Krumwiede et al. ......... 501/64 |
| 6,235,666 B1 | | 5/2001 | Cochran et al. |
| 6,274,523 B1 | | 8/2001 | Krumwiede et al. |
| 6,287,998 B1 | | 9/2001 | Seto et al. |
| 6,333,287 B1 | * | 12/2001 | Seto ..................... 501/64 |
| 6,376,403 B1 | | 4/2002 | Koyama et al. |
| 6,403,509 B2 | * | 6/2002 | Cochran et al. ........... 501/64 |
| 2001/0006927 A1 | | 7/2001 | Cochran et al. |
| 2002/0049128 A1 | | 4/2002 | Koyama et al. |
| 2002/0058579 A1 | | 5/2002 | Seto et al. |

FOREIGN PATENT DOCUMENTS

| | | | |
|---|---|---|---|
| DE | 196 36 600 A1 | | 3/1998 |
| EP | 0 677 492 A1 | | 10/1995 |
| EP | 0 825 156 A1 | | 2/1998 |
| EP | 0 738 243 B1 | | 9/1998 |
| EP | 1 041 050 A1 | | 10/2000 |
| EP | 0 816 296 B1 | | 2/2001 |
| EP | 0 653 386 | | 5/2001 |
| EP | 1 201 615 | | 5/2002 |
| GB | 2325927 A | * | 12/1998 |
| JP | 4 280834 | | 10/1992 |
| WO | WO 01/17920 | | 3/2001 |
| WO | WO 01/58820 | | 8/2001 |

OTHER PUBLICATIONS

U.S. Patent Application Ser. No. 09/766,673 filed Jan. 23, 2001.

* cited by examiner

*Primary Examiner*—David Sample
(74) *Attorney, Agent, or Firm*—Nixon & Vanderhye P.C.

(57) ABSTRACT

A grey glass composition employing as its colorant portion at least iron ($Fe_2O_3$/FeO) and erbium oxide (e.g., $Er_2O_3$), and also preferably selenium and cobalt. An exemplary colorant portion for use in a glass composition (with a soda lime silica or other suitable base glass) includes, by weight percentage:

| | |
|---|---|
| Total iron (expressed as $Fe_2O_3$): | 0.1 to 0.6% |
| erbium oxide (e.g., $Er_2O_3$): | 0.3 to 1.5% |
| selenium (Se): | 0.0002 to 0.0010% |
| cobalt oxide (e.g., $Co_3O_4$): | 0.0005 to 0.0018% |
| titanium oxide (e.g., $TiO_2$): | 0.0 to 1.0% |
| boron oxide (e.g., $B_2O_3$): | 0.0 to 2.0% |

The resulting glass may exhibit high visible transmittance (Lta), while at the same time low UV and IR transmittance.

27 Claims, No Drawings

GREY GLASS COMPOSITION INCLUDING ERBIUM

This is a continuation-in-part (CIP) of U.S. patent application Ser. No. 09/766,673, filed Jan. 23, 2001 published as U.S. Pat. No. 6,521,558, the disclosure of which is hereby incorporated herein by reference.

This invention relates to grey glass compositions and methods of making the same. More particularly, this invention relates to erbium-containing grey glass compositions having low light transmittance in the UV (ultraviolet) and IR (infrared) ranges and high light transmittance in the visible range. Such glass compositions are thus useful, for example, in windows and windshields in the automotive industry and also in architectural applications.

BACKGROUND OF THE INVENTION

The automotive industry, for a number of years, has desired glass having grey color (sometimes called "neutral grey") for automotive window applications. At the same time, it is also desirable for transmission in the UV and/or IR ranges of the light spectrum to be minimized. Moreover, certain Governmental regulations in the automotive industry have been known to require that visible light transmittance be at least 70% in certain vehicular windows when provided by the original equipment manufacturer of the vehicle (e.g. GM, Ford, Chrysler etc.) in the U.S.A. Accordingly, there exists a need in the automotive industry for a glass which achieves these properties (a similar need may also exist in other industries such as the architectural glass industry).

A glass window or other glass article is said to have the desirable color "grey" when it has a dominant wavelength of from 435 nm to 570 nm (this dominant wavelength range defines the color "grey" herein). Moreover, grey glass preferably has an excitation purity of less than about 4.5%. In certain embodiments, it may be preferable to have a dominant wavelength of from 470 nm to 570 nm, or even from 480–560 nm, with purity of from about 0.2 to 4.5%.

While glass having "grey" color is often desirable, there sometimes also exists a need or desire to achieve certain levels of light transmission defined conventionally by:

Lta as visible light transmission,
UV as ultraviolet light transmission, and
IR as infrared light transmission.

Glass thickness ranges of from about 1–6 mm, more preferably from about 3–4 mm, are typically used when measuring the aforesaid characteristics. These thickness ranges are generally recognized as conventional thicknesses for glass sheets made by the float glass process, as well as recognized thickness ranges in the automotive industry.

For automotive windows (including windshields) it is often desirable for glass to have one or more of the following characteristics at any or all of the aforesaid thicknesses:

Lta: at least about 70%
UV: no greater than about 43%, more preferably no greater than 40%
IR: no greater than about 46%, more preferably no greater than about 42%

Classically formulated grey glasses often include low levels of iron (i.e., less than 0.2% total iron) along with cobalt and nickel oxides. Unfortunately, while this type of glass may achieve satisfactory coloration in certain instances, it typically suffers from undesirable solar characteristics. Certain nickel-free grey glasses combine selenium (Se) and cobalt (Co) oxide with iron oxide, but also suffer from poor solar performance characteristics.

Certain known green solar control float glasses are formulated so as to achieve desirable solar characteristics due in large part to their use of large quantities of total iron (e.g., 0.60 to 0.84% total iron). Unfortunately, the green coloration of such glasses does not always harmonize well with certain exterior automotive paints and sometimes affects vehicle interiors when viewed through the glass.

Commonly owned EP 1 041 050 (see also U.S. Ser. No. 09/277,749) discloses a grey glass composition capable of achieving the aforesaid characteristics, including the desirable color grey. In particular, EP 1 041 050 discloses a grey glass with a colorant portion including 0.5–0.8% total iron (expressed as $Fe_2O_3$), 0.5–3.0% $Er_2O_3$, and 0.0–1.0% $TiO_2$. Moreover, the colorant portion is said to be "substantially free of selenium" (Se) and "substantially free of cobalt" (Co). While the grey glass of EP 1 041 050 is an excellent glass, it is sometimes undesirable in that it requires much of the very expensive erbium oxide ($Er_2O_3$). Rather large amounts of total iron (expressed as $Fe_2O_3$) are also required in many examples.

U.S. Pat. No. 5,264,400 discloses a bronze glass including 0.2 to 3% by weight erbium (Er) in the form of $Er_2O_3$. Small amounts of Se and/or Co are also present in certain examples. Unfortunately, the glasses of the '400 patent are bronze, not grey. This is evidenced by the dominant wavelengths in Table 2 of the '400 patent, which are all above 570 nm. Moreover, the erbium-inclusive glasses of Examples 1–9 of the '400 patent require large amounts of cerium (Ce), i.e., 0.40% and greater. Such high amounts of cerium are undesirable. Instead, it would be desirable if cerium could be avoided in such large doses for at least the following reason. Iron is often introduced into glass in the form of $Fe_2O_3$, part of which is reduced to FeO to achieve low IR transmittance values. Cerium, often introduced into glass in the form of $CeO_2$, is known to oxidize divalent iron ($Fe^{2+}$) to trivalent iron ($Fe^{3+}$) either directly or in combination other reducing agent(s) present in the glass melt. Therefore, coexistence of iron oxide and cerium oxide will inevitably lead to a decrease in the concentration of FeO in the glass and thus will reduce the IR absorbing power of the glass.

In view of the above, it is apparent that there exists a need in the art for a new glass composition which overcomes the above problems while achieving one or more of desired grey color and desired solar management property(ies) of the particular industry in which it is to be used.

SUMMARY OF THE INVENTION

An object of this invention is to provide a grey glass (i.e., having a dominant wavelength of from 435nm to 570 nm) including a colorant portion which may include from 0.50 to 1.20%, by weight, erbium oxide ($Er_2O_3$), and from about 0.10 to 0.60%, by weight total iron (expressed as $Fe_2O_3$).

Another object of this invention is to provide a colorant portion for use in a glass composition (with a soda lime silica or other suitable base glass), the colorant portion comprising (or consisting essentially of in certain embodiments), by weight percentage:

| | |
|---|---|
| total iron (expressed as $Fe_2O_3$): | 0.10 to 0.60% |
| erbium oxide (e.g., $Er_2O_3$): | 0.50 to 1.20% |
| Se (including FeSe herein): | 0.0002 to 0.0010% |
| cobalt oxide (e.g., CoO and/or $Co_3O_4$) | 0.0007 to 0.0018% |

-continued

| Ingredient | wt. % |
| --- | --- |
| titanium oxide (e.g., TiO$_2$): | 0.0 to 1.0% |
| boron oxide (e.g., B$_2$O$_3$): | 0.0 to 1.5% |

Generally speaking, certain embodiments of this invention fulfill one or more of the above listed objects by providing a grey colored glass comprising:

a base glass portion comprising:

| Ingredient | wt. % |
| --- | --- |
| SiO$_2$ | 67–75% |
| Na$_2$O | 10–20% |
| CaO | 5–15% |
| MgO | 0–5% |
| Al$_2$O$_3$ | 0–5% |
| K$_2$O | 0–5% |
| BaO | 0–1% | and a colorant portion consisting essentially of:

| | |
| --- | --- |
| total iron (expressed as Fe$_2$O$_3$) | 0.10 to 0.60% |
| erbium oxide | 0.30 to 1.50% |
| selenium (Se) | 0.0002 to 0.0010% |
| cobalt oxide | 0.0005 to 0.0018% |
| titanium oxide | 0.0 to 1.0% |
| boron oxide | 0.0 to 2.0% | wherein the grey colored glass has a dominant wavelength in the range of from 435 nm to 570 nm.

In other embodiments of this invention, one or more of the above-listed objects is/are fulfilled by providing a grey colored glass comprising:

| Ingredient | Wt. % |
| --- | --- |
| SiO$_2$ | 67–75% |
| Na$_2$O | 10–20% |
| CaO | 5–15% |
| MgO | 0–5% |
| Al$_2$O$_3$ | 0–5% |
| K$_2$O | 0–5% |
| BaO | 0–1% |
| total iron (expressed as Fe$_2$O$_3$) | 0.10 to 0.60% |
| erbium oxide | 0.30 to 1.50% |
| Se | 0.0002 to 0.0010% |
| cobalt oxide | 0.0005 to 0.0018% |
| titanium oxide | 0.0 to 1.0% |
| boron oxide | 0.0 to 2.0%. |

In certain exemplary embodiments, the glass composition is substantially free of cerium and/or nickel. In certain embodiments, the amount of Se may be from 0.0 to 0.0010%.

DETAILED DESCRIPTION OF CERTAIN EMBODIMENTS OF THIS INVENTION

Grey glasses according to different embodiments of this invention may be used, for example, in the automotive industry (e.g., windshields, backlites, side windows, etc.), in architectural applications, and in other suitable applications.

Certain glasses according to this invention utilize soda-lime-silica flat glass as their base composition/glass, to which is added certain ingredients making up a unique colorant portion. An exemplary soda-lime-silica base glass according to certain embodiments of this invention, on a weight percentage basis, includes the following basic ingredients:

TABLE 1

EXEMPLARY BASE GLASS

| Ingredient | Wt. % |
| --- | --- |
| SiO$_2$ | 67–75% |
| Na$_2$O | 10–20% |
| CaO | 5–15% |
| MgO | 0–5% |
| Al$_2$O$_3$ | 0–5% |
| K$_2$O | 0–5% |
| BaO | 0–1% |

Other minor ingredients, including various conventional and refining aids, such as SO$_3$, carbon, and the like may also be included in the base glass. In certain embodiments, for example, glass herein may be made from batch raw materials silica sand, soda ash, dolomite, limestone, with the use of salt cake (SO$_3$) and/or Epsom salts (e.g., about a 1:1 combination of both) as refining agents. Reducing agent(s) such as Si (metallic), Si, silicon monoxide, SiO, sucrose, and/or carbon may also be used. Preferably, soda-lime-silica base glasses herein include by weight from about 10–15% Na$_2$O and from about 6–12% CaO. While a soda-lime-silica base glass set forth above is preferred in certain embodiments of this invention, this invention is not so limited. Thus, other base glasses (e.g., borosilicate glass) may instead be employed in alternative embodiments.

To the base glass (e.g., see Table 1 above), the instant invention adds a colorant portion which causes the resulting glass to be grey in color (i.e., dominant wavelength of from 435nm to 570 nm) and achieve desirable solar management properties (e.g., low UV and IR transmission coupled with high visible transmission). In certain preferred embodiments, the resulting grey glass has a dominant wavelength of from 480 nm–560 nm (nanometers). Moreover, the resulting glass preferably has an excitation purity (Pe) no greater than about 4.5%, and most preferably from 0.2% to 4.5%.

In certain embodiments of this invention, an exemplary colorant portion that is added to the base glass is substantially free of cerium and nickel (i.e., no more than 0.0030% Ce, CeO, and/or CeO$_2$, and no more than 0.0010% Ni and/or NiO), and is characterized as set forth in Table 2 below (in terms of weight percentage of the total glass composition):

TABLE 2

EXEMPLARY COLORANT PORTION

| Ingredient | Wt. % |
| --- | --- |
| Total iron (expressed as Fe$_2$O$_3$): | 0.10–0.60% |
| erbium oxide (e.g., Er$_2$O$_3$): | 0.30–1.50% |
| selenium (Se): | 0.0002–0.0010% |
| cobalt oxide (e.g., Co$_3$O$_4$): | 0.0005–0.0018% |
| titanium oxide (e.g., TiO$_2$): | 0.0–1.0% |
| boron oxide (e.g., B$_2$O$_3$) | 0.0–2.0% |

In certain more preferred embodiments, the colorant portion may include: from about 0.20 to 0.56% total iron (more preferably from about 0.35 to 0.50% total iron); from 0.50 to 1.20% erbium oxide (including but not limited to Er$_2$O$_3$) (more preferably from 0.60 to 0.90% erbium oxide); from 0.0003–0.0010% Se (more preferably from about 0.0004–0.0007% Se); from 0.0007–0.0018% cobalt oxide (i.e., CoO including but not limited to $Co_3O_4$) (more preferably from about 0.0007–0.0015% cobalt oxide); from 0.0–0.70% titanium oxide (i.e., including but not limited to $TiO_2$) (more preferably from 0.0–0.15% titanium oxide); and/or from 0.0to 1.5% boron oxide (i.e., including but not limited to $B_2O_3$) (sometimes from 0–1.0 weight % $B_2O_3$). In certain embodiments of this invention, the colorant portion is substantially free of other colorants (other than potentially trace amounts) so that the colorant portion consists essentially of the above ingredients. However, it should be appreciated that small amounts of other materials (e.g., refining aids, melting aids, and/or impurities) may be present in the glass such as chromium, manganese, molybdenum, tin, chlorine, zinc, zirconium, Si, sulfur, fluorine, lithium and strontium, without taking away from the purpose(s) and/or goal(s) of the instant invention.

The total amount of iron present in the glass and in the colorant portion thereof is expressed herein in terms of $Fe_2O_3$ in accordance with standard practice. This, however, does not imply that all iron is actually in the from of $Fe_2O_3$. Likewise, the amount of iron in the ferrous state is reported herein as FeO, even though all ferrous state iron in the glass may not be in the form of FeO. The proportion of the total iron in the ferrous state (i.e., FeO) is used to determine the redox state of the glass, and is expressed as the ratio $FeO/Fe_2O_3$, which is the weight percentage (%) of iron in the ferrous state (expressed as FeO) divided by the weight percentage (%) of total iron (expressed as $Fe_2O_3$). Thus, $Fe_2O_3$ herein means total iron and FeO means iron in the ferrous state. According to certain embodiments of this invention, the colorant portion of the glass composition herein is characterized by a redox value (i.e., $FeO/Fe_2O_3$) of from 0.10 to 0.25, more preferably from 0.13 to 0.20.

Moreover, it is noted that glass according to this invention is often made via the known float process in which a tin bath is utilized. It will thus be appreciated by those skilled in the art that as a result of forming the glass on molten tin in certain exemplary embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath).

Glasses of this invention, as stated above, achieve a true grey or neutral grey color, as opposed to bronze or other coloring. Such a true "grey" color is best defined, as aforesaid, by referring to: (1) "dominant wavelength", and/or (2) "excitation purity." In certain embodiments, glasses herein include one or more of the following CIE LAB color coordinates [Ill. C, 2 degree observer] when measured at a nominal thickness of from about 1 mm–6 mm (and preferably for most uses, at about 3 mm–4 mm):

| | |
|---|---|
| L* | about 86–91 |
| a* | about –2.4 to +3.0 |
| b* | about –5.0 to +2.0 |

When used in the automotive market for windows and/or windshields that must conform to certain minimal visible light transmission properties, glass articles of this invention (e.g., at 3 mm thicknesses for purposes of reference) preferably have an Lta of at least 70% and, in certain embodiments at least about 72%, and in still further instances at least about 73%; an IR transmission percentage (%) of no greater than 46%, more preferably no greater than 42%, and most preferably from 33–42%. Additionally, in certain exemplary embodiments, glasses herein have a UV transmission percentage (%) of no greater than about 43%, more preferably no greater than 40%.

The glasses of this invention achieve the above unique characteristics (i.e., desired grey color in combination with desired solar management properties, e.g., Lta, UV, IR) in base glasses (e.g., silicate glasses such as soda-lime-silica, or borosilicate glasses) through the use of the unique colorant portion which includes from 0.10 to 0.60% total iron (more preferably from 0.20 to 0.56%, and most preferably from 0.35 to 0.50% total iron-expressed as $Fe_2O_3$) in combination with a relatively low amount of erbium oxide (e.g., $Er_2O_3$), i.e., from 0.3 to 1.5%, more preferably from about 0.50 to 1.20%. Erbium acts as a pink colorant, while the FeO aspect of the total iron acts as a blue colorant. As discussed above, selenium and cobalt are also utilized in the colorant portion for coloration purposes to achieve the desired grey color. In particular, lower amounts of total iron are used in the colorant portion of glasses herein relative to certain examples in EP 1 041 050. In view of the amount of FeO at such a total iron level, it has been found that lower amounts of the costly $Er_2O_3$ are appropriate in order to achieve the desired grey coloration. It has also been found that the lower amounts of total iron may be compensated for by the use of the Se/Co color pair to induce additional absorption and improve grey coloration.

With regard to Se, in certain embodiments Se may be introduced into the glass batch in amounts of, for example, from 5–20 ppm, more preferably from 10–20 ppm. In order to increase retention of Se and to improve homogeneity of the glass through a more uniform Se distribution in the melt, compositions of this invention may use various sources of Se, such as sodium and/or calcium selenites, iron and/or cobalt selenides, and/or metallic Se powder. Moreover, while Se often combines with iron as iron selenide (FeSe) in glass to produce brown color, and does so in certain embodiments of this invention, selenium is referred to in the colorant portion herein as "Se" which is meant to include, for example, its state as Se as well as its state in glass as FeSe. While the use of Se is preferred in the colorant portion as discussed above, it is noted that in some embodiments Se need not be present. Thus, in some embodiments, the colorant portion may include Se in the amount of 0.0 to 0.0010% by weight, more preferably from 0.0002 to 0.0010%.

Regarding cobalt (Co), this blue colorant may be added to the glass batch in amounts of, for example, 10–30 ppm. Moreover, it is believed that much of the cobalt in the glass is in the oxide state of $Co_3O_4$. However, other oxide states of CoO are also possible in glasses according to this invention. Thus, unless expressly stated to the contrary, the terms "CoO" and "$Co_3O_4$" as used herein include not only cobalt in this/these particular oxide state(s), but also include(s) cobalt which may be present in other oxide state(s).

EXAMPLES

The glasses of this invention may be made from batch ingredients using well known glass melting and refining techniques once given the above final glass analysis. For example, in a single, conventional batch technique for melting, the following base glass batch was used for the two Examples herein (note: the below-listed ingredients in the batch will add up to 100% by weight once oxides thereof are accounted for; thus, they need not add up to one hundred as raw materials):

| Batch Ingredient for Base Glass | Parts by Wt. |
|---|---|
| sand | 71.5 |
| soda ash | 23.7 |
| dolomite | 18.32 |
| limestone | 6.1 |
| Epsom salt | 0.9 |
| Sucrose | 0.3 |

In addition to the base glass materials above, the colorant portions for Examples 1 and 2 herein are as follows (wt. % of total glass):

| Compound | Example 1 | Example 2 |
|---|---|---|
| total iron ($Fe_2O_3$): | 0.46 | 0.47 |
| erbium oxide (e.g., $Er_2O_3$): | 0.75 | 0.75 |
| selenium (Se): | 0.0003 | 0.0004 |
| cobalt oxide ($Co_3O_4$): | 0.0012 | 0.0010 |

Solar characteristics for the Example 1 glass were as follows:

| EXAMPLE 1 SOLAR CHARACTERISTICS | | |
|---|---|---|
| Thickness (mm): | 3 mm | 4 mm |
| % Lta: | 71.8% | 67.2% |
| % IR: | 41.7% | 36.8% |
| a* | 2.05 | 2.46 |
| b* | 0.38 | 0.54 |

Solar characteristics for the Example 2 glass were as follows:

| EXAMPLE 2 SOLAR CHARACTERISTICS | | |
|---|---|---|
| Thickness (mm): | 3 mm | 4 mm |
| % Lta: | 73.2% | 68.8% |
| % IR: | 41% | 33% |
| a* | 1.05 | 1.21 |
| b* | −0.15 | −0.12 |

In manufacturing these example glasses reference above, the base glass batch material together with the colorant portion was melted in a platinum (or alumina) crucible at 1500 degrees C. for about four hours, in a laboratory electric melting furnace. Thereafter, it was cast into graphite molds, and annealed at 620 degrees C. for half an hour, and then allowed to cool down to room temperature. The example glasses (i.e., samples) were then polished to the desired thickness (i.e., 3 mm or 4 mm in the Examples above) and spectral measurements above were taken with a Perkin Elmer spectrophotometer to determine the light transmittance in the wavelength range from 250 to 2,000 nm. The results are set forth in the tables above.

It is noted that CIE LAB techniques herein are in accordance with CIE Publication 15.2 (1986) and ASTM: E 308-90 [Ill. C, 2 degree observer]. Moreover, luminous transmittance (Lta) [2 degree observer] is understood in the art, and is used herein in accordance with its known meaning, e.g., see U.S. Pat. No. 5,308,805. This term is also known as Ill. A visible transmittance (380–780 nanometers inclusive), and its measurements are made in accordance with CIE Publication 15.2 (1986)) and ANSI test method Z26.1. The terms, and characteristics, of ultraviolet light transmittance (% UV), infrared energy transmittance (% IR), dominant wavelength (DW) and excitation purity (i.e. % "purity", or Pe) are also well understood terms in the art, as are their measurement techniques. Such terms are used herein, in accordance with their well known meaning, e.g., see U.S. Pat. No. 5,308,805. In particular, ultraviolet transmittance (%UV) is measured herein using Parry Moon Air Mass=2 (300–400 nm inclusive, integrated using Simpson's Rule at 10 nm intervals). IR transmittance is conventionally measured using Simpson's Rule and Parry Moon Air Mass=2 over the wavelength range 800–2100 nm inclusive at 50 nm intervals. Dominant wavelength (DW) is calculated and measured conventionally in accord with the aforesaid CIE Publication 15.2 (1986) and ASTM: E 308-90. The term "dominant wavelength" includes both the actual measured wavelength and, where applicable, its calculated complement. Excitation purity (Pe or % "purity") is measured conventionally in accordance with CIE Publication 15.2 (1986) and ASTM: E 308-90.

It is noted that according to different embodiments of this invention, glass compositions herein may be manufactured via single batch melting techniques, or alternatively via multiple pre-batch mixing techniques utilizing separate pre-batch mixes that are ultimately mixed together to make up a final overall batch mixture. For example, in the latter approach, one of the prebatch mixes could be made up of the iron-containing ingredient (e.g. rouge) along with SiO (silicon monoxide) and optionally, metallic Si (i.e. the reducing agents), and preferably some of the sand. The remaining batch ingredients can then be made up by admixing them in another separate prebatch mix or into two or more prebatch mixes before admixing them with the iron and reducing agent-containing first prebatch mix. After each separate prebatch mix is separately mixed, to form a substantially homogenous powdered admixture, the two or more prebatch mixes are mixed together to form the overall (or final) batch mixture. Conventional melting and refining techniques are then used to form a molten glass from which flat sheet glass or other articles may be formed.

Once given the above disclosure many other features, modifications and improvements will become apparent to the skilled artisan. Such features, modifications and improvements are therefore considered to be a part of this invention, the scope of which is to be determined by the following claims.

What is claimed is:

1. A grey glass comprising:

a base glass portion comprising:

| Ingredient | wt. % |
|---|---|
| $SiO_2$ | 67–75% |
| $Na_2O$ | 10–20% |
| CaO | 5–15% |
| MgO | 0–5% |
| $Al_2O_3$ | 0–5% |
| $K_2O$ | 0–5% |
| BaO | 0–1% | and a colorant portion consisting essentially of:

| | |
|---|---|
| total iron (expressed as $Fe_2O_3$) | 0.10 to 0.60% |
| erbium oxide | 0.30 to 1.50% |
| selenium (Se) | 0.0002 to 0.0010% |
| cobalt oxide | 0.0005 to 0.0018% |
| titanium oxide | 0.0 to 1.0% |
| boron oxide | 0.0 to 2.0% | wherein the grey glass has a dominant wavelength in the range of from 435 nm to 570 nm.

2. The glass of claim 1, wherein the glass has an excitation purity (Pe) of no greater than about 4.5%, and the colorant portion includes from 0.20 to 0.56% total iron (expressed as $Fe_2O_3$).

3. The glass of claim 2, wherein said dominant wavelength and excitation purity are measured at a nominal thickness of the glass of anywhere from 3 mm to 4 mm.

4. The glass of claim 1, wherein the glass composition is substantially free of cerium.

5. The glass of claim 4, wherein the glass composition is substantially free of nickel.

6. The glass of claim 1, further comprising a redox value $FeO/Fe_2O_3$ of from 0.10 to 0.25.

7. The glass of claim 6, wherein the redox value $FeO/Fe_2O_3$ is from 0.13 to 0.20.

8. The glass of claim 1, wherein the glass has a visible transmission Lta of at least about 70%.

9. The glass of claim 8, wherein the glass has an IR transmission of no greater than about 42%, and a UV transmission of no greater than 40%.

10. The glass of claim 1, wherein the colorant portion includes: from about 0.20 to 0.56% total iron (expressed as $Fe_2O_3$), and from about 0.5 to 1.2% erbium oxide.

11. The glass of claim 10, wherein the colorant portion includes from 0.0003 to 0.0010% Se, from 0.0007 to 0.0018% cobalt oxide, and from 0 to 1.5% titanium oxide.

12. The glass of claim 1, wherein the glass has a color characterized as follows when measured according to Ill. C, 2 degree observer, CIE:

| | |
|---|---|
| a* | from −2.4 to +3.0 |
| b* | from −5.0 to +2.0. |

13. The grey glass of claim 1, wherein the glass comprises from about 0.35 to 0.50% total iron.

14. A grey colored glass comprising:

| Ingredient | Wt. % |
|---|---|
| $SiO_2$ | 67–75% |
| $Na_2O$ | 10–20% |
| CaO | 5–15% |
| MgO | 0–5% |
| $Al_2O_3$ | 0–5% |
| $K_2O$ | 0–5% |
| BaO | 0–1% |
| total iron (expressed as $Fe_2O_3$) | 0.10 to 0.60% |

| Ingredient | Wt. % |
|---|---|
| erbium oxide | 0.30 to 1.50% |
| Se | 0.0002 to 0.0010% |
| cobalt oxide | 0.0005 to 0.0018% |
| titanium oxide | 0.0 to 1.0% |
| boron oxide | 0.0 to 2.0%. |

15. The glass of claim 14, wherein the glass composition is substantially free of cerium.

16. The glass of claim 14, wherein the glass has a dominant wavelength in the range of from 435 nm to 570 nm.

17. The glass of claim 14, wherein the glass composition is substantially free of nickel.

18. The glass of claim 14, wherein the glass has an excitation purity (Pe) of no greater than about 4.5%, and wherein the colorant portion includes from 0.2 to 0.56% total iron.

19. The glass of claim 18, wherein the colorant portion includes from 0.5 to 1.2% erbium oxide and from 0.0007 to 0.0018% cobalt oxide.

20. The glass of claim 14, wherein the glass has a visible transmittance Lta of at least 70%, and an IR transmission of no greater than 42%, as measured at a glass thickness anywhere from about 3 to 4 mm.

21. The grey colored glass of claim 14, wherein the glass comprises from about 0.35 to 0.50% total iron.

22. The grey colored glass of claim 14, wherein the glass comprises at least about 0.35% total iron.

23. A grey glass composition comprising:
a base glass composition; and
a colorant portion consisting essentially of:

| | |
|---|---|
| total iron (expressed as $Fe_2O_3$) | 0.1 to 0.6% |
| erbium oxide | 0.50 to 1.20% |
| Se | 0.0002 to 0.0010% |
| cobalt oxide | 0.0007 to 0.0018% |
| titanium oxide | 0.0 to 1.0% |
| boron oxide | 0.0 to 2.0% | wherein the grey glass composition has a dominant wavelength in the range of from 435 nm to 570 nm.

24. The glass composition of claim 23, wherein the base glass composition comprises one of a soda-lime-silica base glass composition and a borosilicate base glass composition, and wherein the colorant portion includes from 0.2 to 0.56% total iron.

25. The glass composition of claim 23, wherein the colorant portion includes from 0.35 to 0.5% total iron and from 0.0007 to 0.0018% cobalt oxide.

26. The grey glass composition of claim 23, wherein the glass composition comprises from about 0.35 to 0.50% total iron.

27. The grey glass composition of claim 23, wherein the glass comprises at least about 0.35% total iron.

* * * * *